Feb. 12, 1957  J. L. MONTGOMERY  2,781,482
SERVO SYSTEMS
Filed Sept. 21, 1953

INVENTOR.
JAMES L. MONTGOMERY
BY
ATTYS.

United States Patent Office 2,781,482
Patented Feb. 12, 1957

2,781,482

SERVO SYSTEMS

James L. Montgomery, Indianapolis, Ind., assignor to the United States of America as represented by the Secretary of the Navy Application September 21, 1953, Serial No. 381,526

7 Claims. (Cl. 318—29)

(Granted under Title 35, U. S. Code (1952), sec. 266)

The invention described herein may be manufactured and used by or for the Government of the United States of America for governmental purposes without the payment of any royalties thereon or therefor.

My invention relates to servo systems of the type in which potentiometers are used to measure shaft displacement and is particularly directed to means for preventing the motor-driven wiper contact of a potentiometer from over-running the limits defining the ends of the potentiometer winding.

The closed loop type of servo system comprises essentially an element to be moved, such as a shaft to be turned in response to the movement of a controlling element sometimes remotely located. A motor supplies the power to move the control element and is actuated to drive the element in either direction in response to a so-called error signal. The error signal is usually a difference voltage obtained by comparing two voltages which are analogous, respectively, with the displaced positions of the controlling and controlled elements. The displaced positions of the controlling and controlled elements are usually quantitized by potentiometers, the position of the wiper contact of the potentiometer conveniently producing a voltage indicative of its position on the potentiometer winding. Because of space required for terminal connections to the resistance, it is seldom that the wiper can drive more than about 320°, the remaining 40° being used for the connections. When the wiper reaches either end of the resistance the motor should stop but because of its inertia it sometimes tends to overdrive the wiper causing the wiper to leave the end of the resistance and rest on an end tab. Once this takes place the voltage of the wiper no longer represents its position and the error signal becomes erratic and can no longer properly instruct the motor. Various mechanical devices have been produced heretofore for preventing over-running of the wiper, for example, spring buffers at the ends of the resistance have been provided against which the wiper may strike. Then there has been suggested a cam operated switch which inserts a resistance in one of the motor leads to reduce the power of the motor near the end sections of the potentiometer. Solid stops have been used, but inertial energy often causes mechanical damage to the wiper or to the gear train which drives the wiper. Finally, clutches have been introduced between the motor and its wiper to save the gear train when the wiper hits the solid end stops. Such mechanical devices are bulky, costly in manufacture, and critical in adjustment.

The object of my invention is an improved servo mechanism in which potentiometers are used to measure shaft displacement.

A more specific object of my invention is an improved servo system in which potentiometers are used to measure shaft displacement and in which electrical controls are provided between potentiometer wipers to eliminate relative displacements between the wipers and to prevent over-running of the ends of the potentiometer winding.

Other objects of my invention will become apparent in the description of the specific embodiments illustrated in the accompanying drawings and discussed in the following specification.

In the accompanying drawings.

Figure 1:
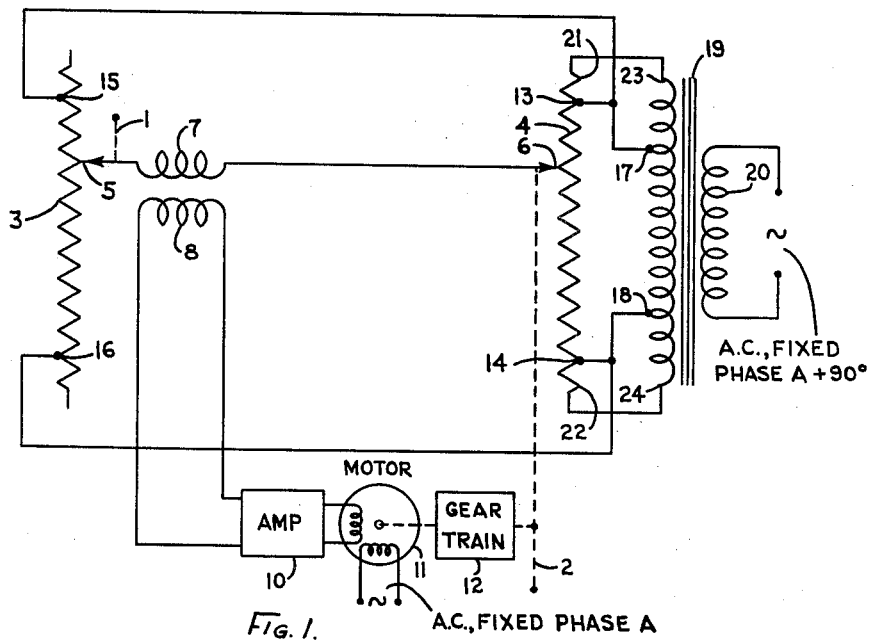
Fig. 1 is a circuit diagram of one embodiment of my improved servo system.

The principal elements of the closed loop servo system of Fig. 1 comprise an input or controlling element 1, the displacement of which either linearly or rotationally must be followed by a corresponding displacement at the mechanical output 2 of the system. The mechanical input and output elements are solidly linked, respectively, with position indicating devices which, in the embodiment shown, comprise potentiometers 3 and 4 and their contact wipers 5 and 6. The positions of the wipers 5 and 6 are conveniently compared by comparing the potentials of the wipers which are respectively determined by the positions of the wipers intermediate the ends of the potentiometer resistance. Hence, if steady voltages, either A. C. or D. C., are applied across the ends of the potentiometers, voltages at the wipers may be calibrated in terms of the positions of the wipers. The wiper voltages, in Fig. 1, are applied, respectively, to the ends of the primary winding 7, so that the voltage across the secondary winding 8 indicates the magnitude of the difference in the two positions. The phase of the voltage across winding 8 indicates the position of wiper 6, above or below, with respect to the null position defined by wiper 5. It will be perceived that if the potential of either wiper 5 or 6 should suddenly become zero or some radical voltage not known to the intermediate section of the potentiometer resistance, the error voltage at 8 would become meaningless.

The error signal at 8 is appropriately amplified by amplifier 10 and is then applied to the motor 11. The output shaft of motor 11 is coupled, usually through a gear train 12, to the output element 2 of the system. The motor output also is coupled through the gear train 12 to the wiper 6. The motor 12 must be capable of running in either direction and must be sensitive to the phase of the voltage at winding 8. It is preferred that motor 11 be of the two-phase type with one winding connected to a fixed phase A, and that the potentiometers be energized with another alternating current of the same frequency but displaced 90° from phase A.

In operation, controlling element 1 is moved manually, or automatically as by the output shaft of another equipment such as a computer, to displace wiper 5 to a new position on resistance 3. The now resulting voltage difference between wipers 5 and 6 appears at 8, which error signal after amplification drives the motor to bring the wiper 6 into the proper position to reduce the error signal to zero. The phase of the error signal across winding 8 and at the output of amplifier 10 lags or leads fixed phase A by 90 degrees depending on the motor direction required to bring wiper 6 to null. If wipers 5 and 6 are near the electrical ends of their respective potentiometers it is apparent that the mechanical inertia of the system including the motor 11 and its gear train 12 may on occasion drive the wiper 6 beyond the terminal.

According to an important and characteristic feature of my invention the electrical terminals of the potentiometer 4 are moved inwardly from the ends of the resistance to points 13 and 14. The normal range of wiper 6 is now between points 13 and 14, and the corresponding points 15 and 16 on the controlling potentiometer 3 are adjusted to electrically correspond to points 13 and 14. Points 13 and 14 are connected respectively to points 17 and 18 inward from the ends of the secondary winding of transformer 19, the primary winding 20 being connected to a source of regulated alternating current, in this instance 90° out of phase with the alternating current applied to the motor 11. The end sections 21 and 22 of the potentiometer are then connected respectively across the end turns 23 and 24 of the secondary winding. It now becomes apparent that the voltage gradient in the potentiometer end sections 21 and 22 may be made much greater than that of the midsection between points 13 and 14 merely by making the number of end turns 23 and 24 per unit length of end sections 21 and 22 greater than the turns per unit length across the midsection of the potentiometer. When the wiper 5 is at point 15 or above, the instantaneous phase of the error signal produced in coil 7 whenever wiper 6 is above point 13 is opposite in phase to the error signal produced when wiper 6 is below point 13. It follows that if wiper 5 is moved to point 15 or to any point above point 15 and if wiper 6 tends to drive across point 13 because of inertia, the phase of the voltages at wipers 5 and 6 are opposite and the direction and magnitude of the error signal at coil 8 is such as to apply a braking torque to the motor to prevent the wiper 6 from overrunning point 13. Likewise, with the controlling wiper at point 16 or at any point below 16, the phase and gradient of the potential applied to wiper 6 at all points below point 14 produces an error signal and resultant motor torque to prevent the wiper 6 from overrunning point 14.

Since the error signal phase is reversed when either points 13 or 14 tend to be crossed by the wiper 6, the servomotor will halt the wiper 6 at either points 13 or 14 for any position of wiper 5 outside points 15 or 16. Electrical continuity of the error-determining circuits is thus maintained, and operation of the servo at either extremity of its travel cannot accidentally decalibrate the system. My novel terminal connections obviate the necessity for the bulky mechanical stops heretofore used.

Figure 2:
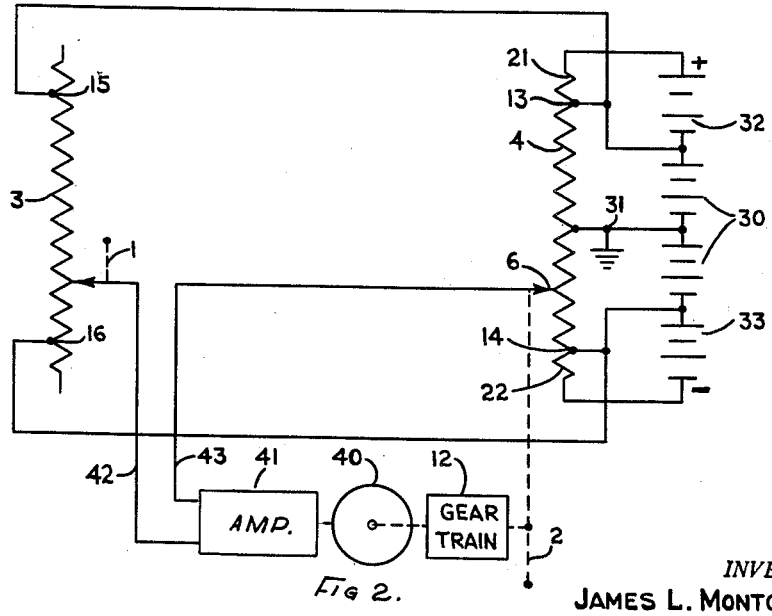
Fig. 2 is a circuit diagram of another embodiment, similar electrically to Fig. 1, of my invention.

The terminal connections of Fig. 1 are conveniently used in the system of Fig. 2 where direct current energizes the error signal circuitry, instead of alternating current. In Fig. 2 the battery 30 is connected to points 13 and 14 of the potentiometer 4, the bridge structure thus defined being grounded, if desired, at the center point 31 of the potentiometer and battery. The end sections 21 and 22 are tapped across the end sections 32 and 33, respectively, of the battery. For operation in accordance with my invention it is merely necessary that the voltage ratings of batteries 32 and 33 be so chosen that the respective voltage gradients in portions 21 and 22 of potentiometer 4 exceeds the voltage gradients in the midsection between points 13 and 14.

The motor 40 for driving the wiper 6 in this modification may comprise a reversible direct current motor of known design, or an alternating current two-phase motor if desired. In the latter case, the direct current error signal should be chopped or otherwise converted to an alternating wave of analogous voltage. If, however, the direct current error signal is not to be converted, the motor 40 may be given torque and direction from the amplitude and polarity information in the error signal. Amplification, without losing polarity sense, to the required level to drive motor 40 may be accomplished by an amplifier 41. Input terminals 42 and 43 are connected, respectively, to wipers 5 and 6 so that the potential difference between the terminals is indicative of the magnitude of geometric displacement between the wipers, and the polarity of the potential is indicative of the up or down, or plus or minus, position of one wiper with respect to the other. Whether or not the bridge circuitry is grounded at the center as shown is a matter of choice, and will be determined largely by the ground desired in the amplifier 41.

The bridge circuitry of my invention effectively, and entirely electrically, prevents the motor driven wiper of the position-determining potentiometer of a servo system from overrunning the ends of the potentiometer. The error signal for instructing the motor, according to my invention, always contains the necessary information to return the controlled element of the servo to the null position determined by the controlling element.

Modifications can undoubtedly be made in the embodiments illustrated without departing from the scope of the invention. For example, the electrical buffer "spring" comprised of the end sections 21 and 22 of the controlled potentiometer for returning an overshooting wiper to points 13 or 14, may be "stiffened" by increasing the potential gradient, in terms of volts per unit of length, of the end sections. The increased gradient may be effected by increasing the voltage of the portion of the source connected across the end sections 21 and 22. Furthermore, the potentiometer 4 shown as a resistance device may comprise an inductive device with turns on a core, as in a conventional variable inductance, substituted for the resistance wire turns. Accordingly, the term voltage divider is used in the appended claims and is intended to define both types.

I claim:

1. A motor follow-up system comprising a motor, a variable voltage divider with a sliding contact driven by said motor to pick off a voltage analogous to the position of a controlled device, connections to the ends of the divider and connections to the divider spaced inwardly from each end of the divider to define a main section and end sections of said divider, means applying potentials to said connections so that instantaneous current flow in the said end sections is greater in amplitude than the current that flows in the said main section, thereby producing a greater voltage gradient in the said end sections than in the said main section, a source of controlling voltage analogous to the position of a controlling device, means comparing the said controlled and controlling voltages to produce an error signal, and means applying the error signal to the said motor.

2. A balanced bridge-type servo system comprising: a transmitting potentiometer having a controlling sliding contact; a receiving potentiometer having a controllable sliding contact and a terminal connection representative of a limiting position of movement of the said controllable sliding contact spaced inward from each end of the potentiometer such that the said terminal connections demarcate a middle and two end sections of the said receiving potentiometer; means coupling the said transmitting potentiometer to the said terminal connections in parallel with the said middle section of the receiving potentiometer; means for connecting an alternating current voltage across the said terminal connections such that the instantaneous voltages on each terminal are opposite in phase and a potential is produced on each of the aforesaid sliding contacts; means comparing the potentials of the two aforementioned sliding contacts to produce an electrical signal representing the position error of the said sliding contacts from null; a motor responsive to the said electrical error-signal coupled to the said controllable sliding contact for restoring the said controllable sliding contact to the null position; and means for applying to each of the said end sections an alternating-current potential in phase with the said alternating-current voltage for establishing in each of the said end sections a voltage gradient exceeding any concurrent gradient produced in the said middle section, such that movement of the said controllable sliding contact onto either end section causes an abrupt reversal in polarity and surge in amplitude of the error-signal applied to the said motor, thereby effectively applying a braking torque to the said motor and, as a result, limiting movement of the said controllable contact to the said middle section of the receiving potentiometer.

3. In a closed-loop servo system including a positioning element, a positionable element having a potentiometer resistance divided into two end portions electrically contiguous with an intermediate portion representing the desired range of movement of the said positionable element, means sensing any error in position which may exist between the positioning element and the positionable element to generate an error-signal representing the direction of the said position error, and a reversible prime mover responsive to the said error-signal coupled to the said positionable element, apparatus for inhibiting movement of the said positionable element beyond the range represented by the said intermediate portion comprising: means for applying a voltage across the said intermediate potentiometer portion; and means for applying another voltage across each of the said potentiometer end portions such that the potential gradient of the voltage on the said end portions is substantially greater than the gradient along the intermediate portion and, as a result, an abrupt increase in the amplitude of the said error signal occurs whenever the said positionable element tends to move beyond the limits of the said intermediate portion thereby developing a braking torque in the said prime mover for effectively restricting movement of the said positionable element to the said intermediate portion.

4. Apparatus as represented in claim 3 wherein the said means for applying the said voltages to the said intermediate and the said end portions comprises means applying an alternating current to the said portions.

5. Apparatus as represented in claim 3 wherein the said means for applying the said voltages to the said intermediate and the said end portions comprises means applying a direct-current potential to the said portions.

6. In a motor-driven servo follow-up system including a position-setting potentiometer, a positionable potentiometer having a slidable voltage pickoff element, apparatus producing an electrical signal representative of any position error between the said voltage pickoff element and the setting of the position-setting potentiometer, a motor responsive to the electrical error-signal, and means coupling the said motor to the said pickoff element, means for preventing movement of the said pickoff element in either direction beyond established limits comprising: connecting terminals conductively affixed to each end of the resistance of the said positionable potentiometer; a connecting terminal spaced inwardly from each end and conductively affixed to the said potentiometer resistance; and means for applying potentials to the said terminals to produce a voltage change per unit length between the said inwardly-spaced terminals smaller than any concurrent voltage change beyond the said inwardly-spaced terminals such that the said inwardly-spaced terminals constitute the aforesaid limits and the said error signal increases abruptly whenever the said pickoff element tends to move beyond the said inwardly-spaced terminals, thereby applying a braking torque to the said motor and effectively preventing movement of the said pickoff element beyond the said limits.

7. A servo follow-up system comprising: a prime mover effectively reversible in direction in response to an error signal; a first potentiometer having a resistance and a sliding contact to pick off a voltage representative of the position of the said contact on the said resistance; means propulsively coupling the said sliding contact to the said prime mover; electrical connections to define a main section and two end sections of the said first-potentiometer resistance; a second potentiometer having a resistance and a sliding contact for picking off a voltage representative of the position of the said contact on the said resistance; means coupling the ends of the said second-potentiometer resistance to the said connections defining the said main section of the first-potentiometer resistance; means for applying voltages to the said connections to produce a voltage gradient along the said end sections exceeding the voltage gradient produced along the said main section; means for combining voltages derived from the sliding contacts of the said first and second potentiometers to produce a first error signal representative of any existing displacement between the relative positions of the said contacts whenever the said first-potentiometer contact is on the said main section and a second error signal, of substantially greater effectiveness than the said first signal, representative of a displacement between the relative positions of the said contacts whenever the said first-potentiometer contact begins to overrun onto the said end sections; and means for communicating the said first and second error signals to the said reversible prime mover such that the said mover is operative in response to the said first error signal to position the said first-potentiometer sliding contact in electrical correspondence with the position of the sliding contact of the said second potentiometer and operative in response to the said second error signal to cause the sliding contact of the said first potentiometer to maintain a position limited substantially to the said main section of the first-potentiometer resistance.

References Cited in the file of this patent

UNITED STATES PATENTS

| | | |
|---|---|---|
| 2,232,982 | Tank | Feb. 25, 1941 |
| 2,302,593 | Bean et al. | Nov. 17, 1942 |
| 2,387,795 | Isserstedt | Oct. 30, 1945 |
| 2,452,311 | Markusen | Oct. 26, 1948 |
| 2,577,483 | Roosdorp | Dec. 4, 1951 |